United States Patent [19]

Lundin

[11] 3,965,948

[45] June 29, 1976

[54] PLANING MACHINE

[75] Inventor: Torgny Folke Uilhelm Lundin, Partille, Sweden

[73] Assignee: Jonsereds Fabrikers Aktiebolag, Partille, Sweden

[22] Filed: Nov. 5, 1974

[21] Appl. No.: 521,193

[30] Foreign Application Priority Data
Nov. 7, 1973  Sweden ............................ 7315102

[52] U.S. Cl. ................................ 144/3 R; 144/116
[51] Int. Cl.² ........................................ B27C 9/04
[58] Field of Search ............. 51/34 E, 80 A, 81 R; 90/21 B; 144/3 R, 116, 117 R, 130

[56] References Cited
UNITED STATES PATENTS

| | | | |
|---|---|---|---|
| 1,733,095 | 10/1929 | Holmes | 51/80 A |
| 2,102,186 | 12/1937 | Nicholson | 144/116 |
| 2,109,450 | 3/1938 | Schlayer | 144/3 R |
| 2,114,389 | 4/1938 | Kingsbury | 51/34 E |
| 2,859,780 | 11/1958 | Carlson | 144/116 X |
| 2,985,205 | 5/1961 | Mann | 144/116 |
| 3,316,947 | 5/1967 | Lyche | 144/3 R |
| 3,805,455 | 4/1974 | Aellig | 51/80 A |

*Primary Examiner*—Al Lawrence Smith
*Assistant Examiner*—Gary L. Smith
*Attorney, Agent, or Firm*—Karl W. Flocks

[57] ABSTRACT

A wood working machine, particularly a planing machine, including a frame and, carried by the frame, a number of independent machine units or assemblies removably mounted in a compact array which facilitates enclosure of said array on all sides together with the frame in a sound attenuating and dust protecting housing. The wood working machine is of compact design, encapsulated in a sound attenuating and dust shielding housing and is equipped with tool units which are interchangeable and readily withdrawable and insertable again in the machine, said units including spindle units which by reason of the special ease of mounting them in and withdrawing them from a slide member housing associated with the respective tool unit, serve as "tool cartridges", while a slide housing constitutes "cartridge chambers" for said tool cartridges. In addition to the advantages gained by the unique construction of the tool units and the spindle units the machine provides exact adjustability with the use of small distributor gearings designed as units and driven by small servomotors and adapted to cooperate with numerical control systems of the machine for tool adjustment according to reference values obtained from the grinding chamber and operation of the machine according to supplied working programs.

21 Claims, 15 Drawing Figures

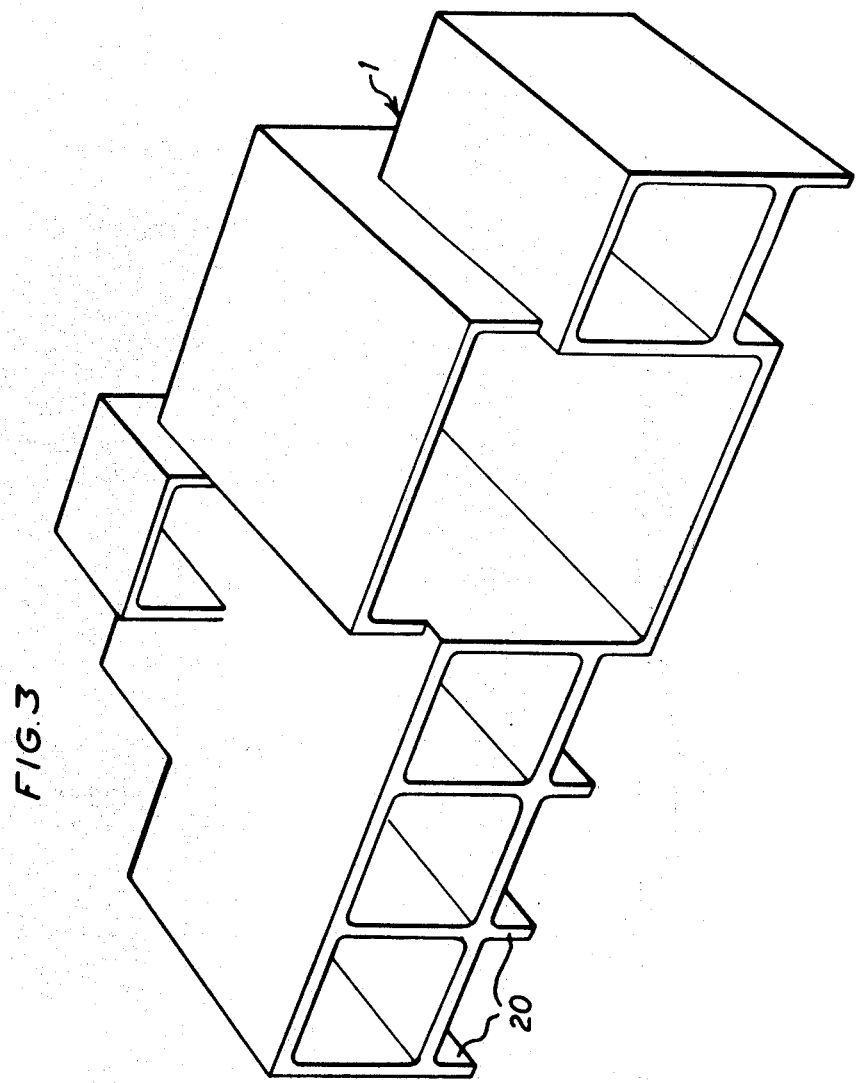

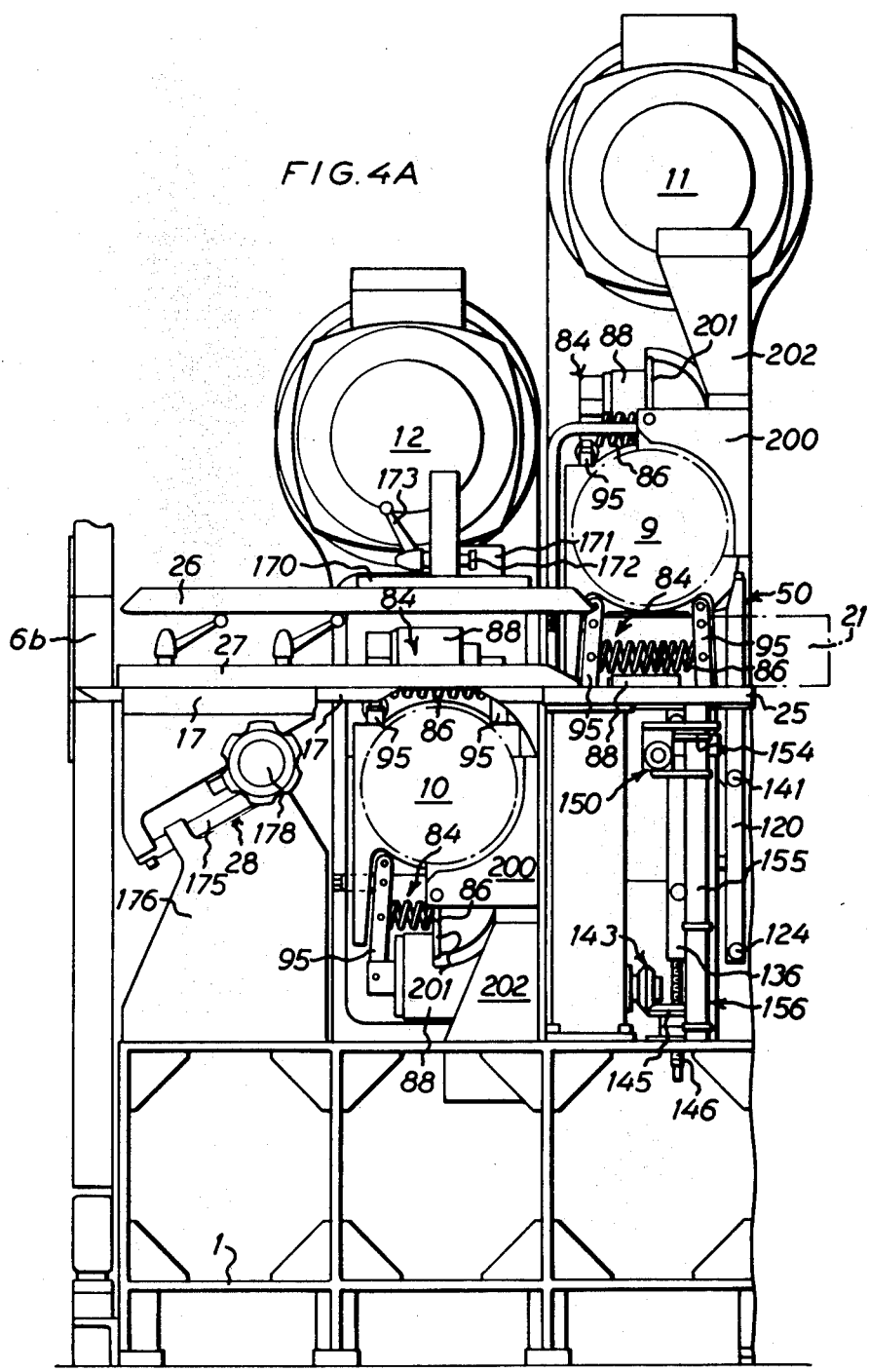

PLANING MACHINE

This invention relates to wood working machines and particularly planing machines, including a frame and machine components carried by the frame and assembled into a number of independent units or aggregates, said machine components comprising at least one motor-driven spindle for a rotary wood working tool, a motor-driven feed mechanism for feeding work pieces to the wood working tool, and adjustable guide means for guiding work pieces to and away from the tool and for keeping them engaged with a base during working, said components and said units assembled therefrom being removably mounted in a compact array which facilitates enclosure of said array on all sides together with the frame in a sound attenuating and dust protecting housing.

Efforts are constantly being made to achieve ever more effective machine tools, entailing demands for increased operating rate, higher productivity, as small capital investments as possible, easy operation and inexpensive maintenance of the machine tools, which besides should have no harmful effects on environment (such as air and noise pollution). It is almost impossible to satisfy these various demands at one and the same time, which applies most particularly to wood working machines having rapidly rotating cutter cylinders.

A modern planing machine must be capable of satisfying the ever increasing demands for surface finish and dimensional accuracy of the articles planed. Novel building methods which int. al. require boards of various types and necessitate industrial large scale production and rational surface finishing, place particularly high demands on surfaces, fits and tolerances. Moreover, economical demands increase and these can be fulfilled only by developing machines which need be supervised by a reduced number of workers and operate at a higher rate of production, implying int.al. that they should operate with as short delays as possible for exchange of tools, resharpenings, adjustments and starts.

On the other hand, the demands for machine tools less harmful to environment have heavily increased in strength, and it must be admitted that these demands are very well-founded as far as planing machines are concerned because of the nature of the work proper. A planing machine with rapidly rotating wood working cutter cylinders produces noise difficult to endure and will thus have to be shielded from the environment both on that account and on account of the air pollution problem which pronouncedly is one of dust formation. In general, isolation of a planing machine from the environment means that it has to be installed in a noise attenuating and dust shielding housing in which personnel should not need to remain for long periods. Said housing should not take up too large a space and, in other words, should be as compact as possible while simultaneously giving easy accessibility to the vital parts of the machine.

Of course, all these various demands are difficult to combine but since none of them can be neglected they have all to be considered, and it is then only natural that the result will generally be considered only as a mediocre compromise.

The above points of view show that one cannot now rest satisfied with improving on the construction of a planing machine in a single aspect without also taking all other aspects into account. In other words, it is not acceptable any more to improve on the performance of the machine without paying attention to environmental problems or to improve on the machine from environmental viewpoints while disregarding economical aspects.

Therefore, the present invention has for its object to provide an effective rapidly operating planing machine which is specially constructed with a view to facilitating its installation or incorporation into a shielding housing for the elimination of noise and air pollution problems and to facilitating maintenance and service work with a minimum of delays for exchange of tools, resharpenings, adjustments, starts etc.

To this end, the wood working section of the machine includes an independent detachable tool unit composed of two subunits which are detachable from one another, one subunit (the spindle unit) being formed by a spindle bearing housing and a spindle mounted in bearings in said housing, while the other subunit for axial adjustment of the spindle and consequently for setting of the tool along a first axis in relation to a movement of the work piece determined by said feed and guide mechanisms includes slide member guiding means and a first slide member with a chamber for the spindle unit, said spindle unit and said chamber being so arranged that the spindle unit is insertable in and withdrawable from the chamber and is axially and radially lockable in a reference position in the chamber by releasable locking means, and said other subunit is arranged to be carried as a second slide member movable on a holder connected to the frame to permit adjustment of the tool on a second axis at right angles to said first axis.

The planing machine according to the invention defined in the foregoing fulfils high demands for performance and favourable environmental factors without any touch of "compromise" that gives precedence to some aspects at the expense of others.

A characteristic feature of the planing machine according to the present invention is that it is equipped with withdrawable cutter cylinders of a particular construction which permits sharpening and adjustment in the simplest conceivable way outside the machine proper and ensures an accuracy of adjustment that is very difficult to obtain with the use of conventional methods. According to the invention, each tool including cutter cylinder, spindle and bearing is formed as a cartridge which permits being withdrawn from or replaced in the machine by a simple motion. This tool can be adjusted, sharpened and honed in the grinding room and is then ready for use. The invention permits simple and rapid handling of the planing machine, the elimination of untrue running and a handling of tools that satisfies all demands for precision. It is possible to have several sets of tool cartridges for each machine, so that one tool can be adjusted while another tool is being used in the machine. For a complete utilization of the precision and rapidity of the cartridge system the machine is preferably equipped for numerical control. In the grinding room the measures of the adjusted, sharpened and honed tool cartridge is read in a positioning instrument and when the cartridge is again in position in the machine the position values read in the grinding room as well as the dimensions of the finished, planed article are fed into the control system, whereupon said system via electronically regulating servomotors takes care of the height and lateral adjustments. It is then possible to start the machine and have the automatic system control the planing procedure for a whole series (lot) of wood pieces, in which already the first work piece is planed as accurately as the last one of the series.

Another characteristic feature of the planing machine according to the invention is that all tools such as the top cutter cylinder, the bottom cutter cylinder and the lateral cutter cylinders are of exactly identical construction, the only difference being their different location. Each cutter cylinder is in the form of a separate unit having its own motors for operation and adjustment. A machine according to the invention can be equipped with an optional number of interchangeable cutter cylinders.

Still another characteristic feature of the planing machine according to the invention is that all details which need not be accessible, are built-in behind sound attenuating walls. In the machine according to the invention only a few means need be accessible since all requisite adjustments can be carried out by means of controls on a control panel. The machine is so arranged that the tool cartridges can be lifted straight out when they are to be exchanged.

The objects and features of the invention will be more fully described hereinbelow and with reference to the accompanying drawings in which:

FIG. 3 shows the box-frame construction of the machine which forms part of the framework of the housing;

Figure 1:
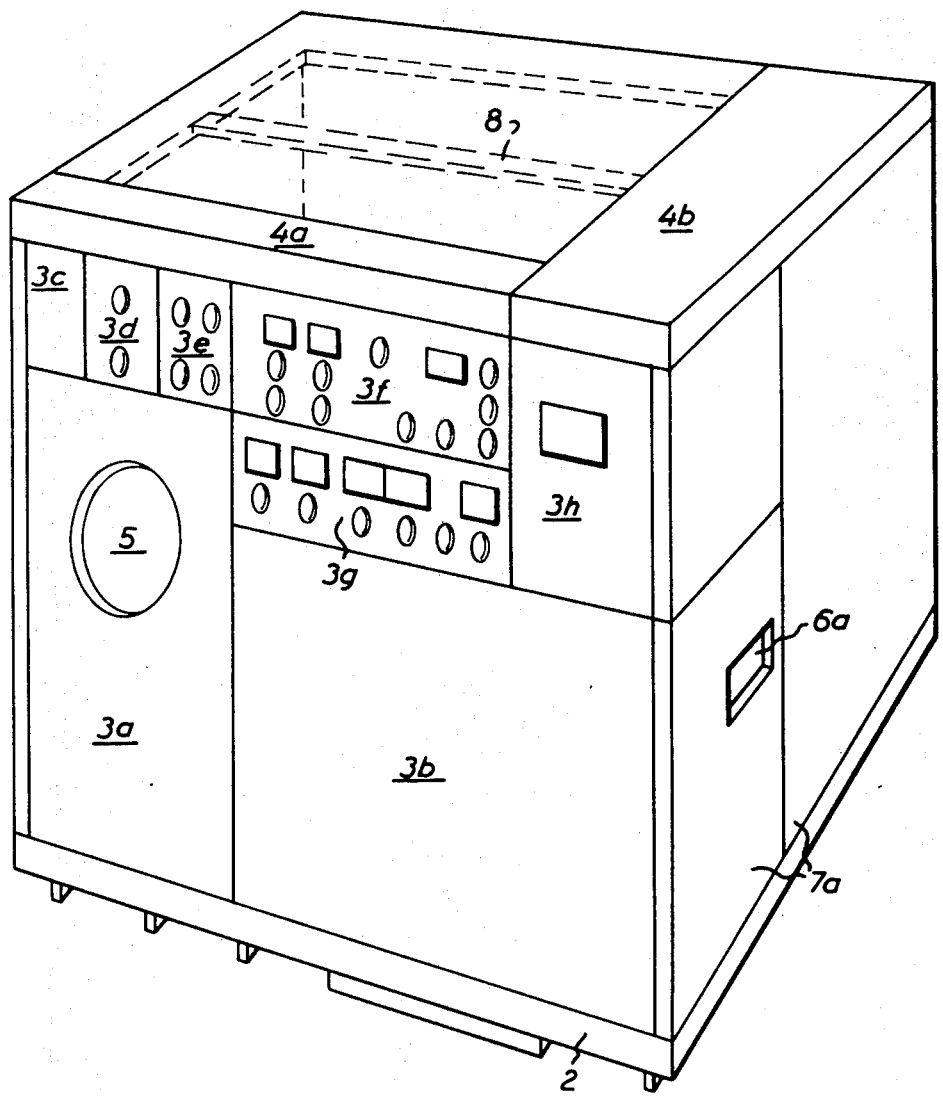
FIG. 1 is a slightly diagrammatic perspective view of the housing in which the planing machine is accommodated.
Figure 4B:
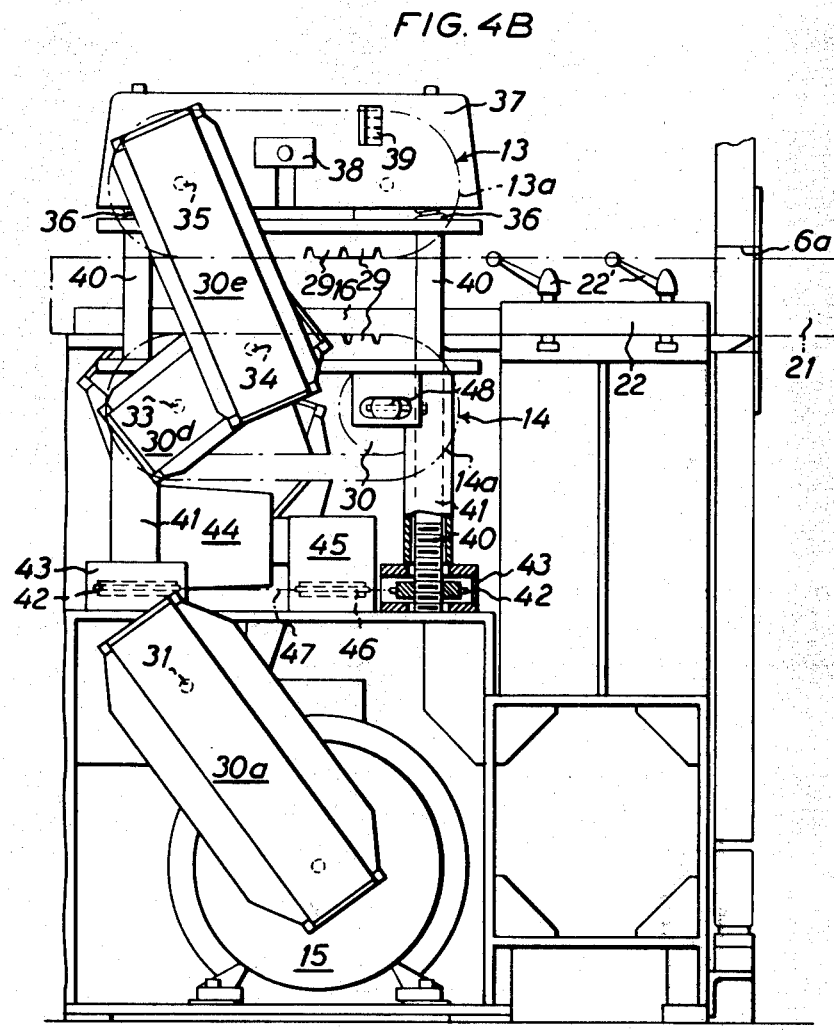
Figure 5:
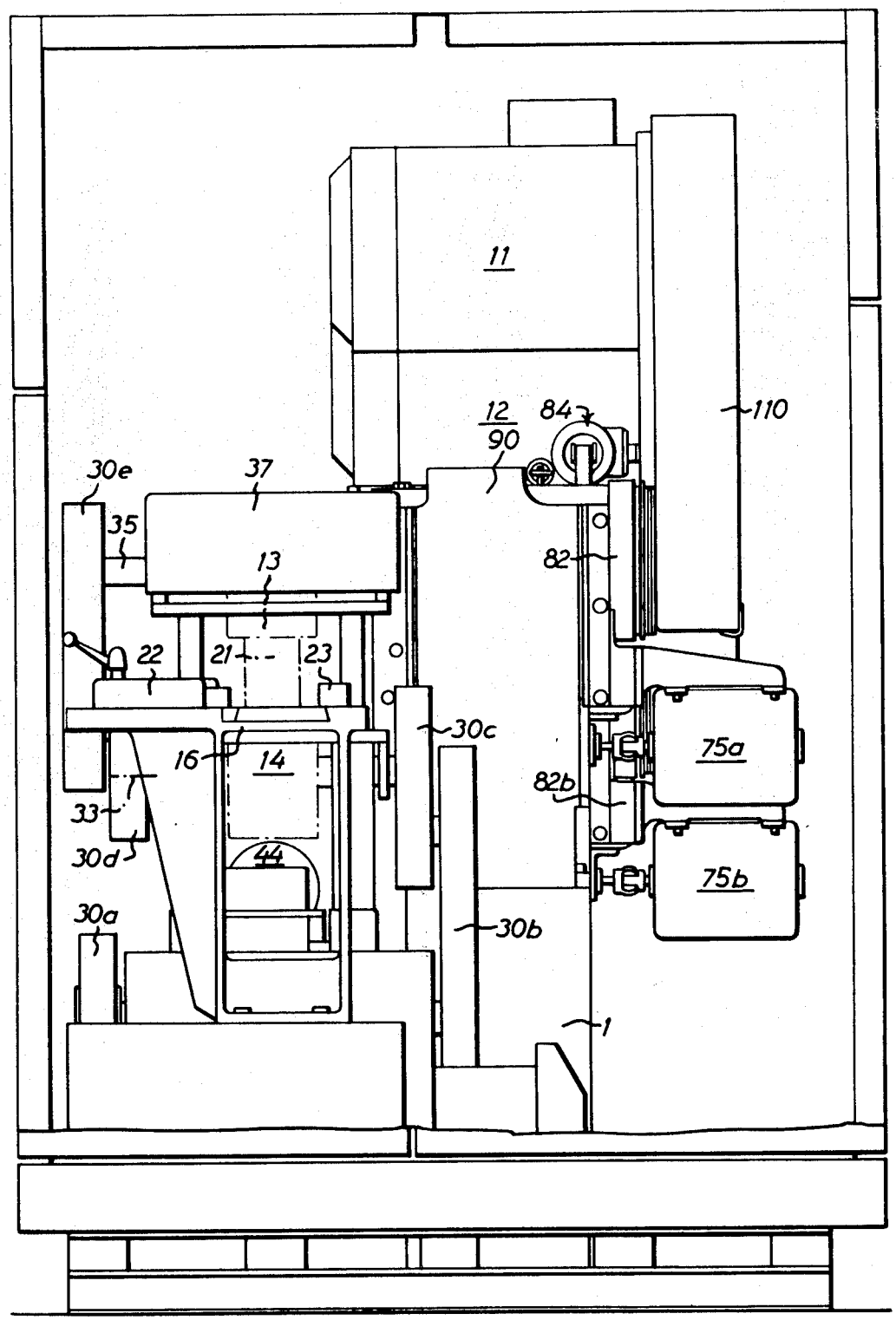
Figure 6:
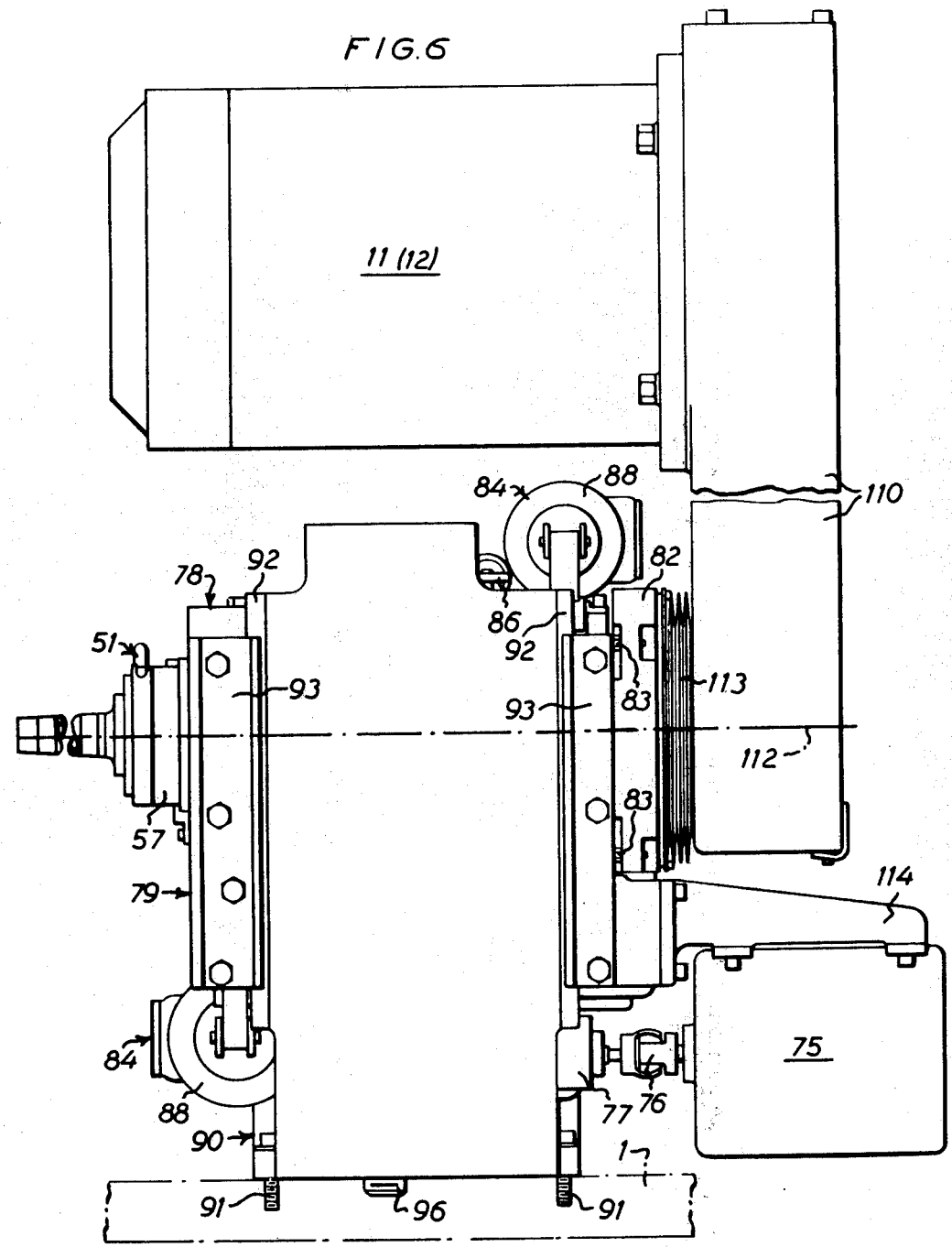
Figure 7:
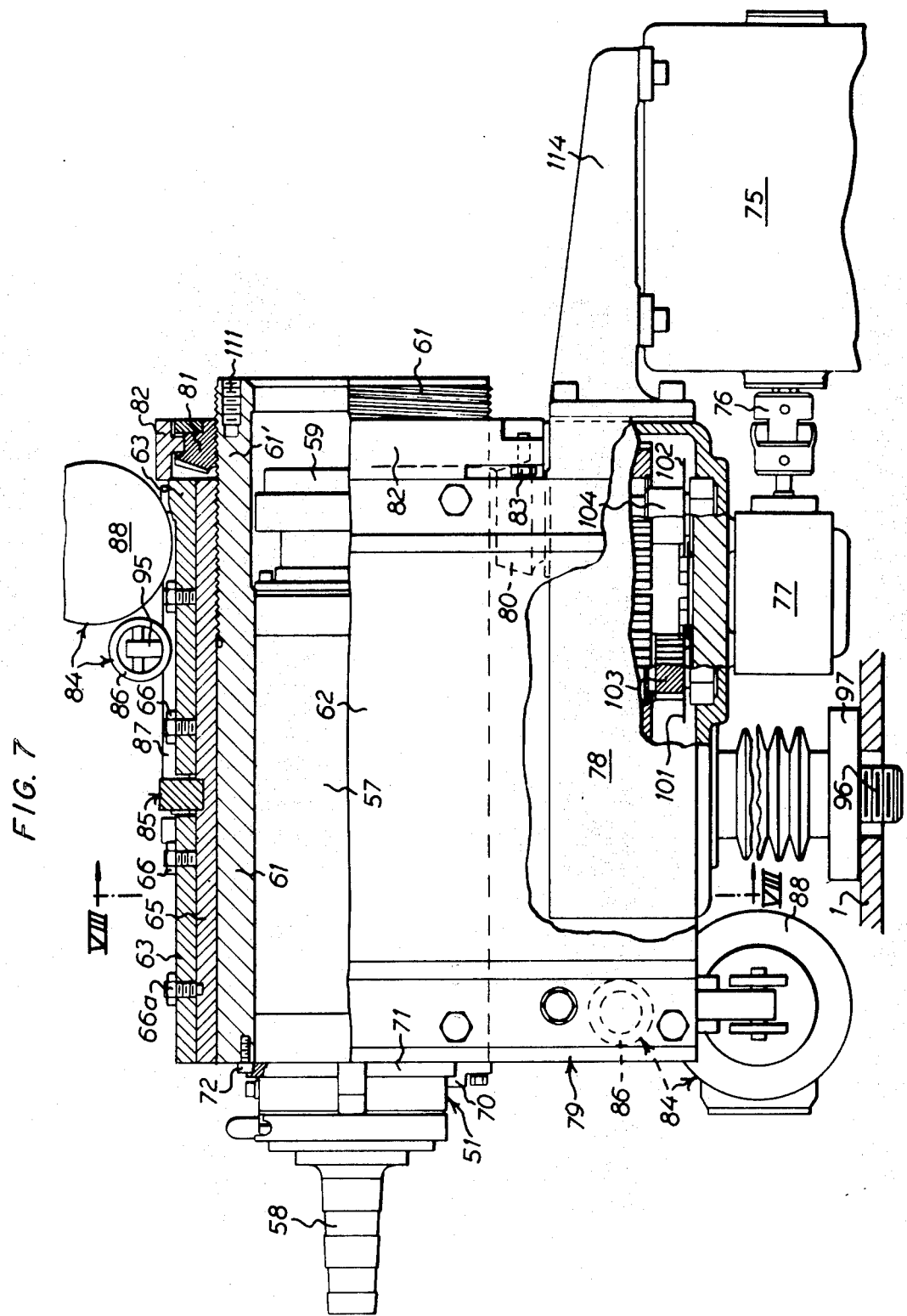
Figure 8:
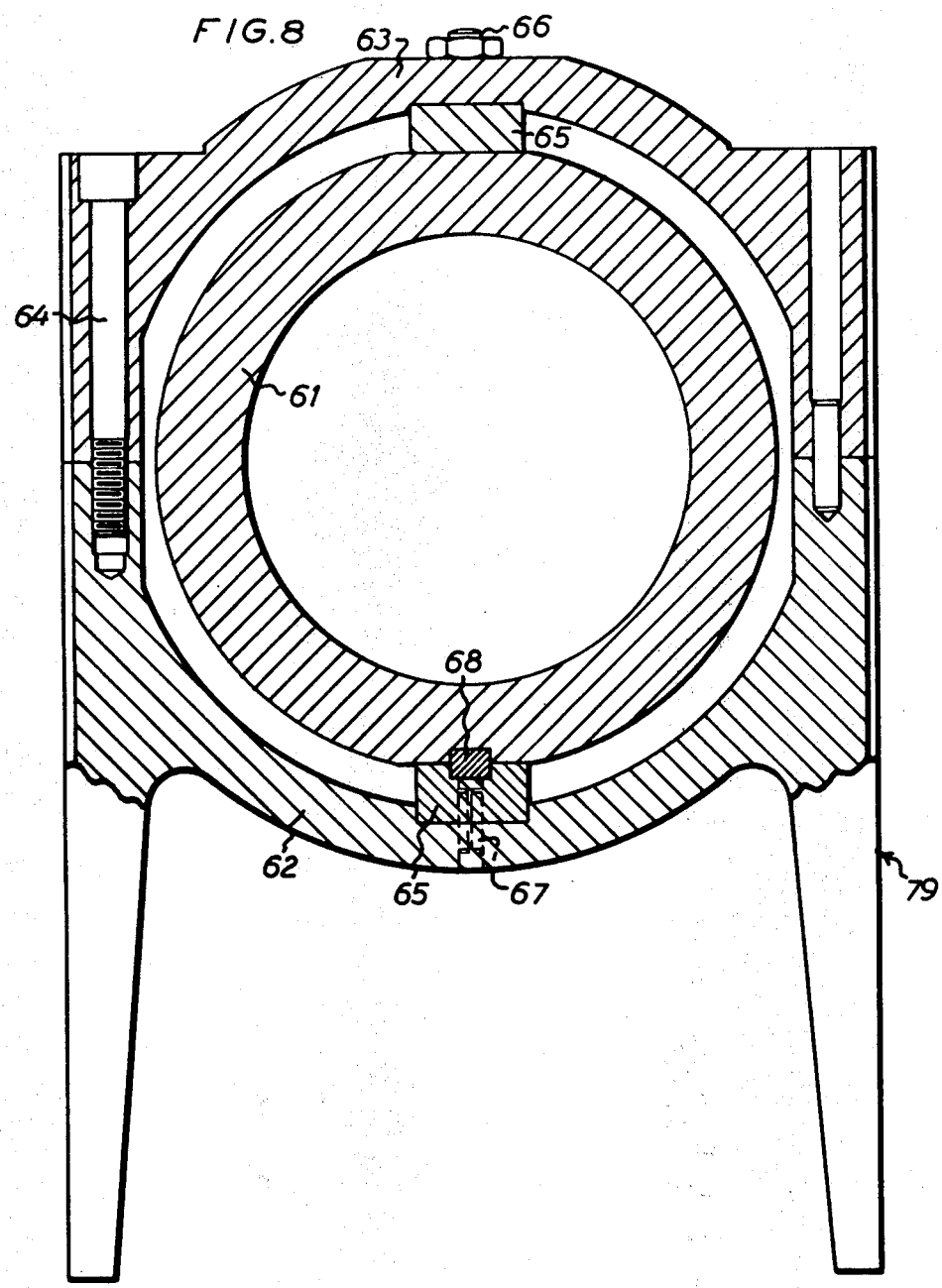
Figure 9:
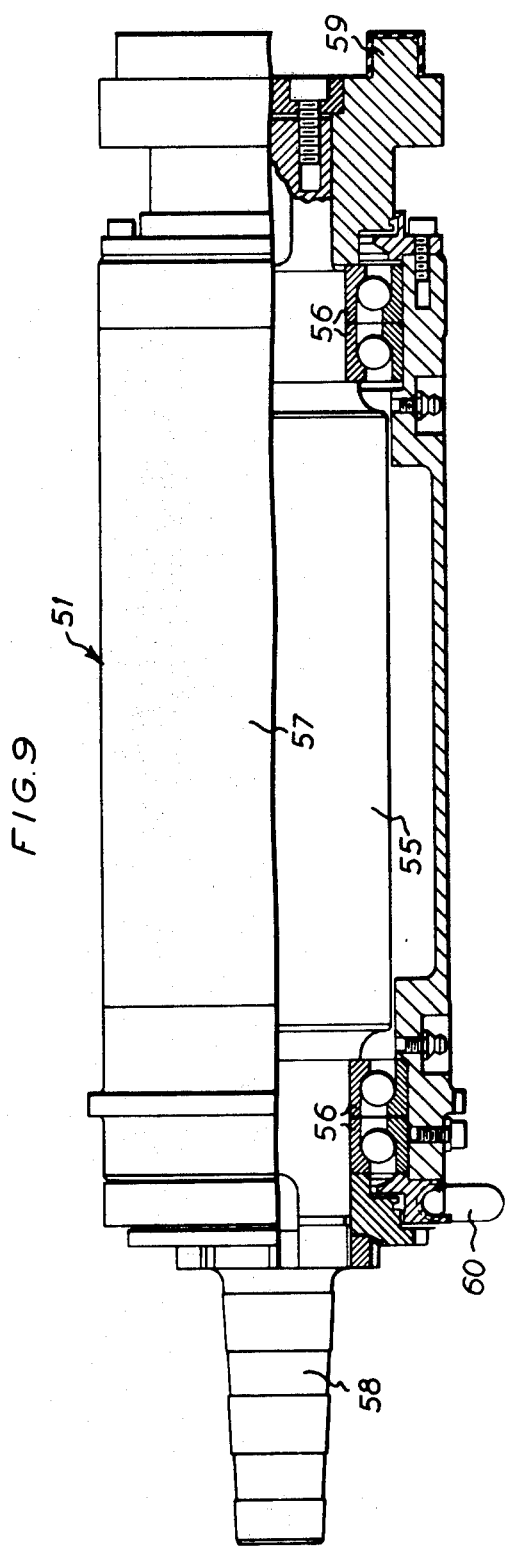
Figure 10:
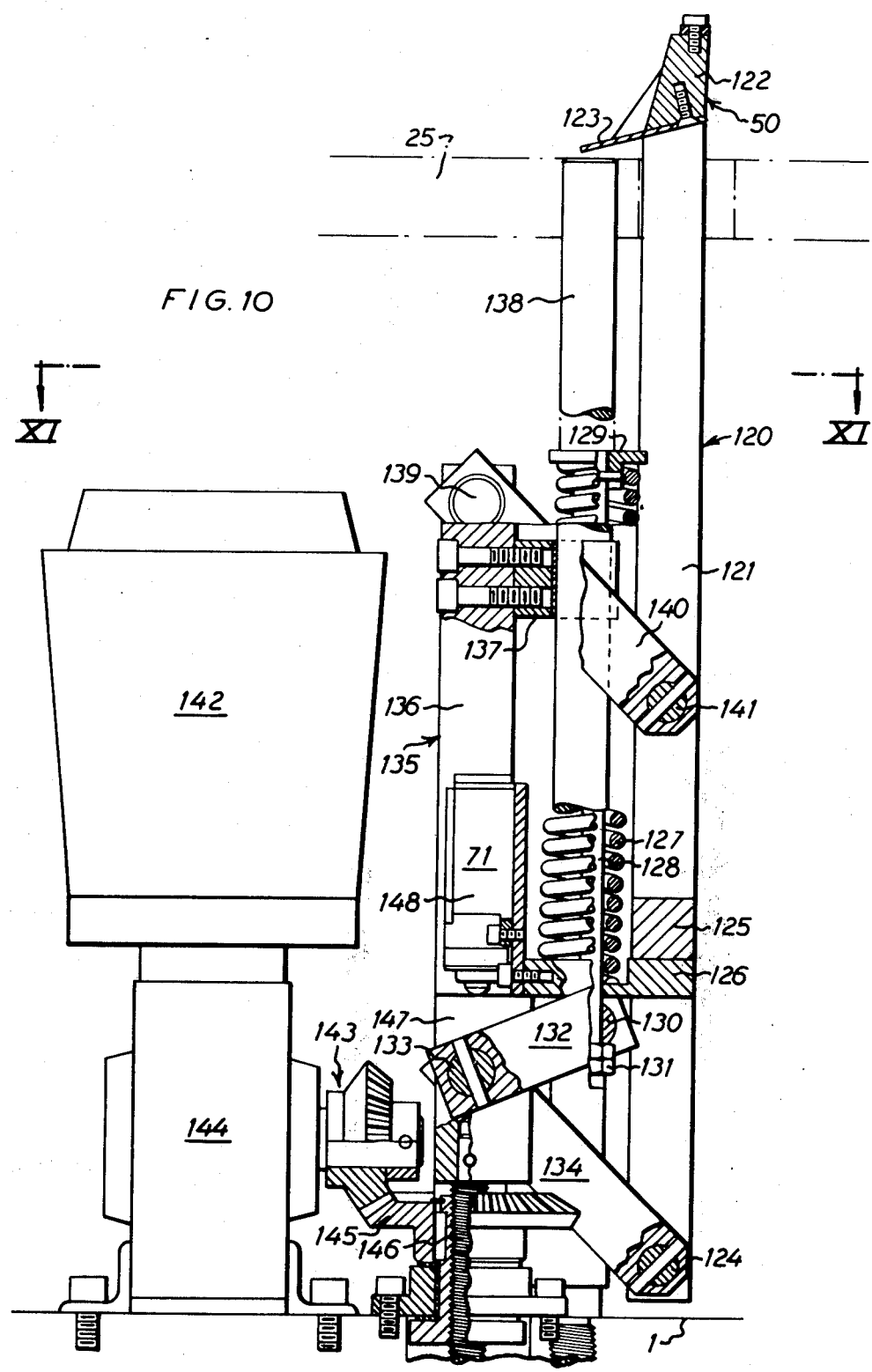
Figure 11:
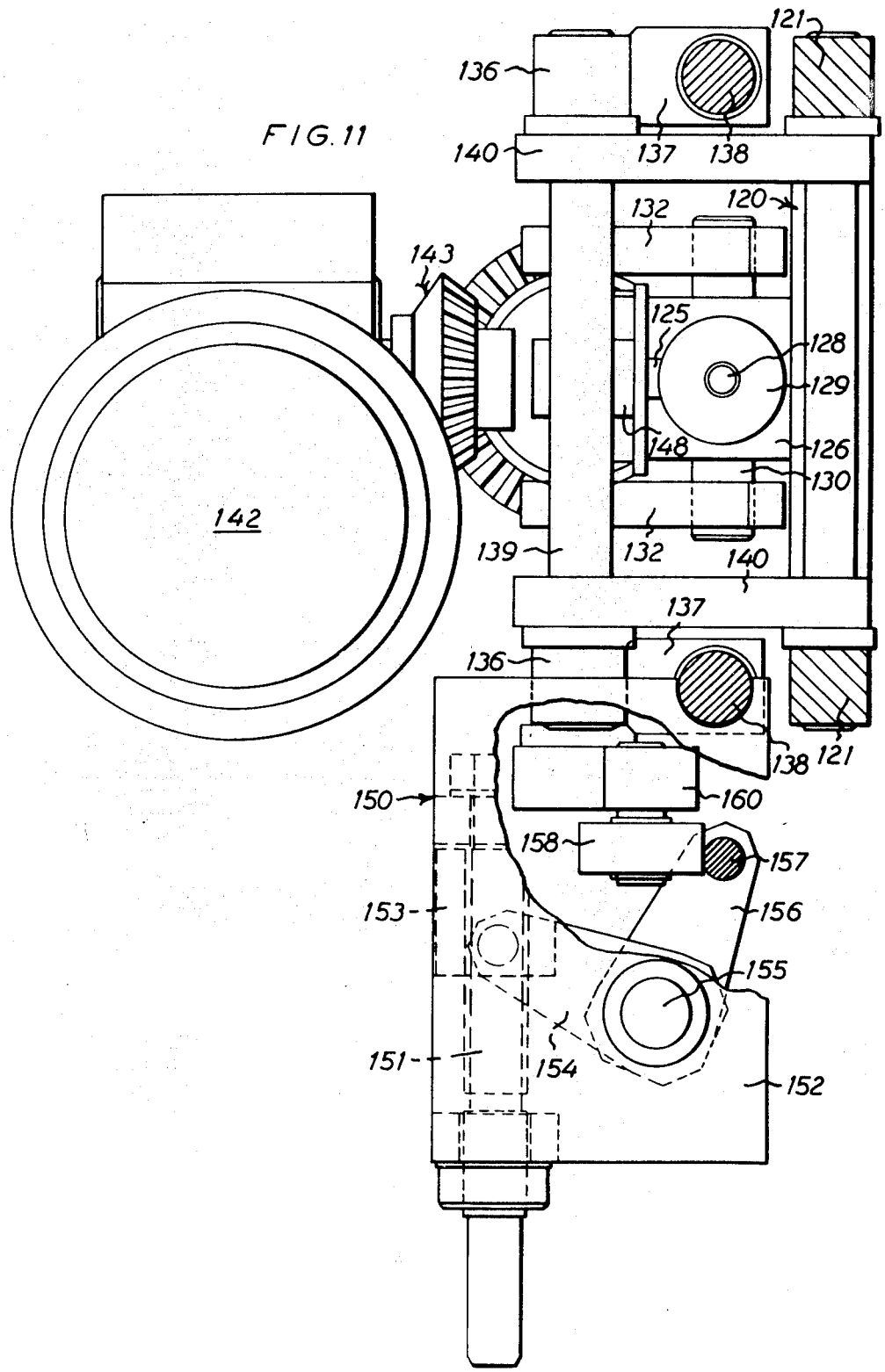
Figure 12:
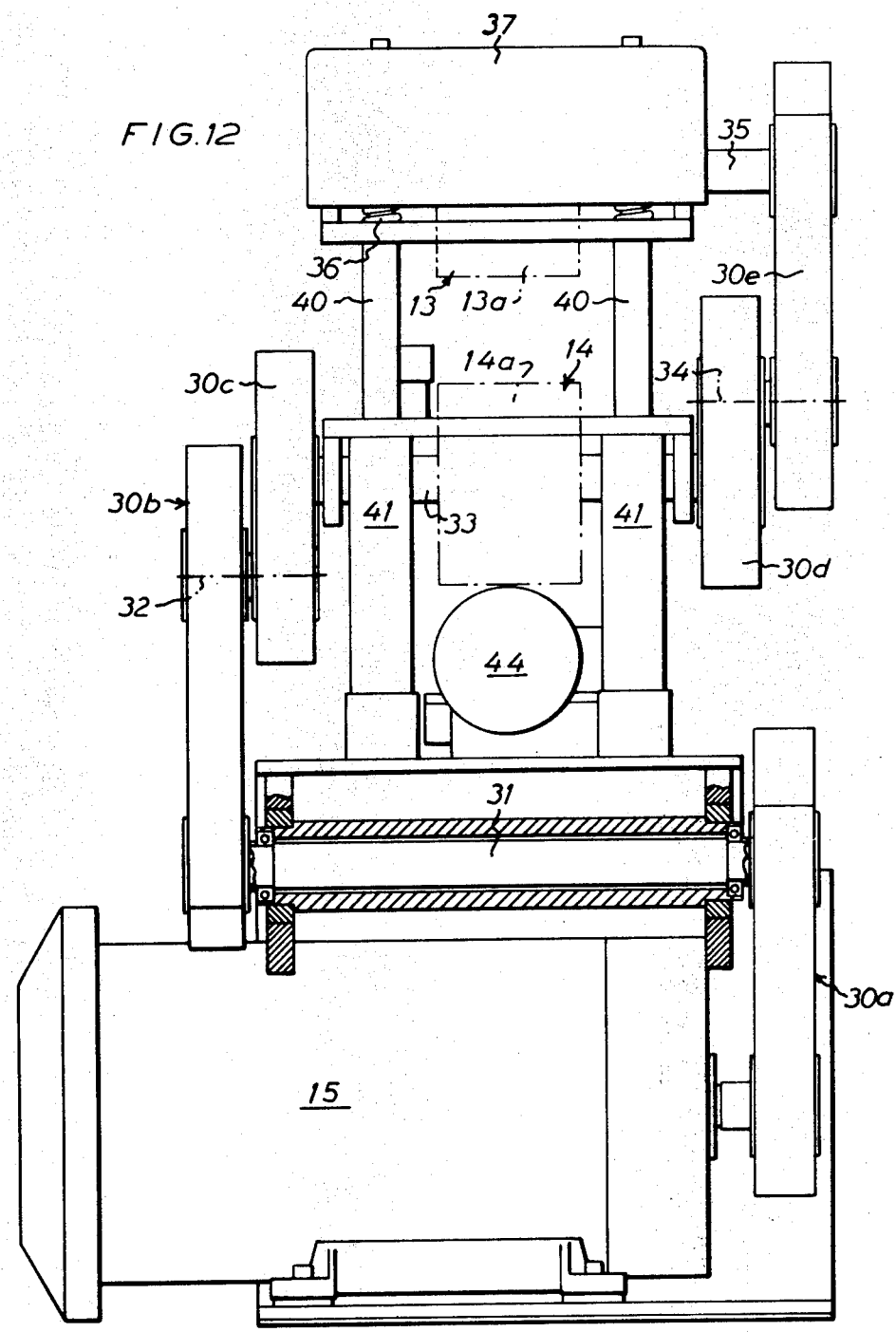
Figure 13:
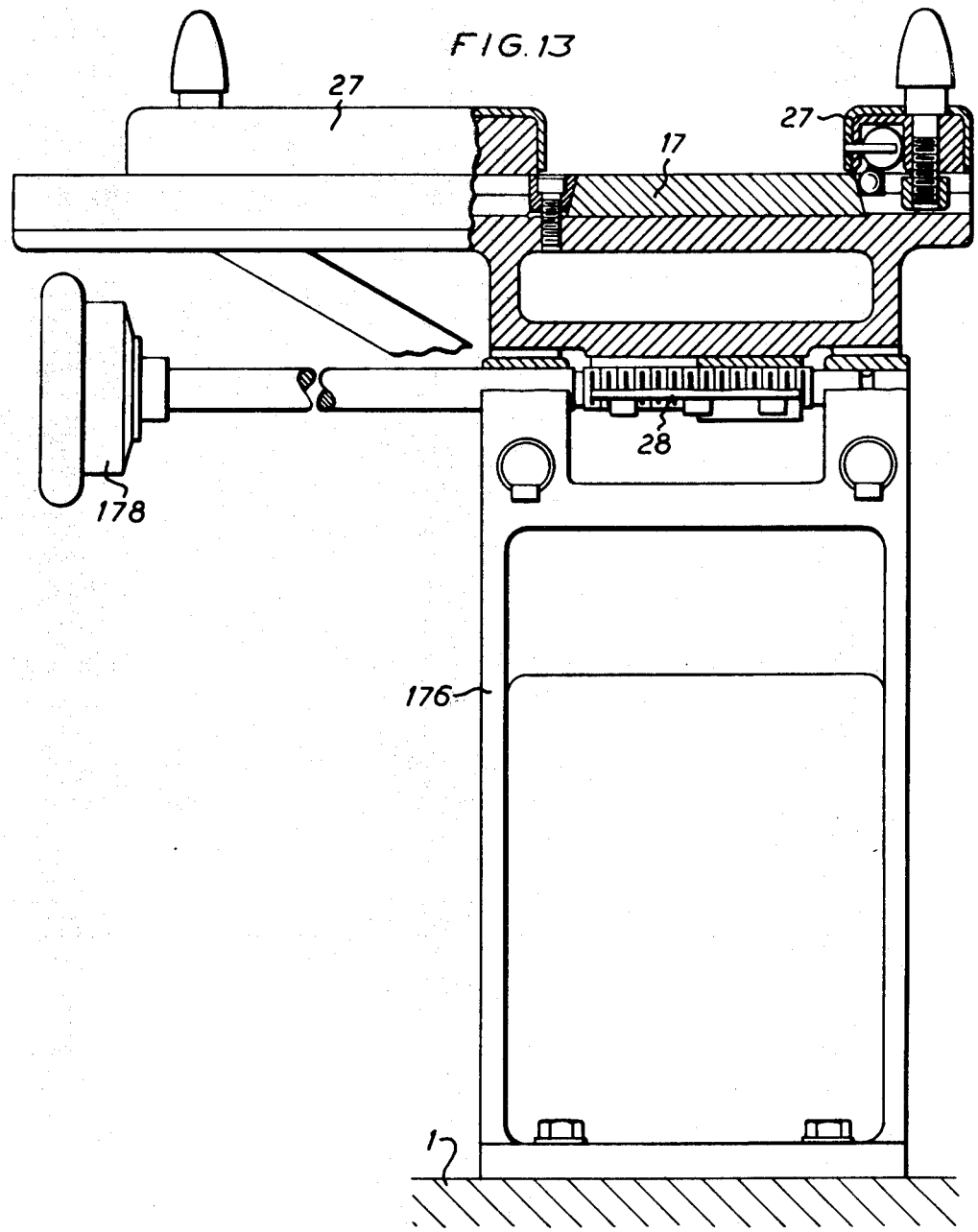
Figure 14:
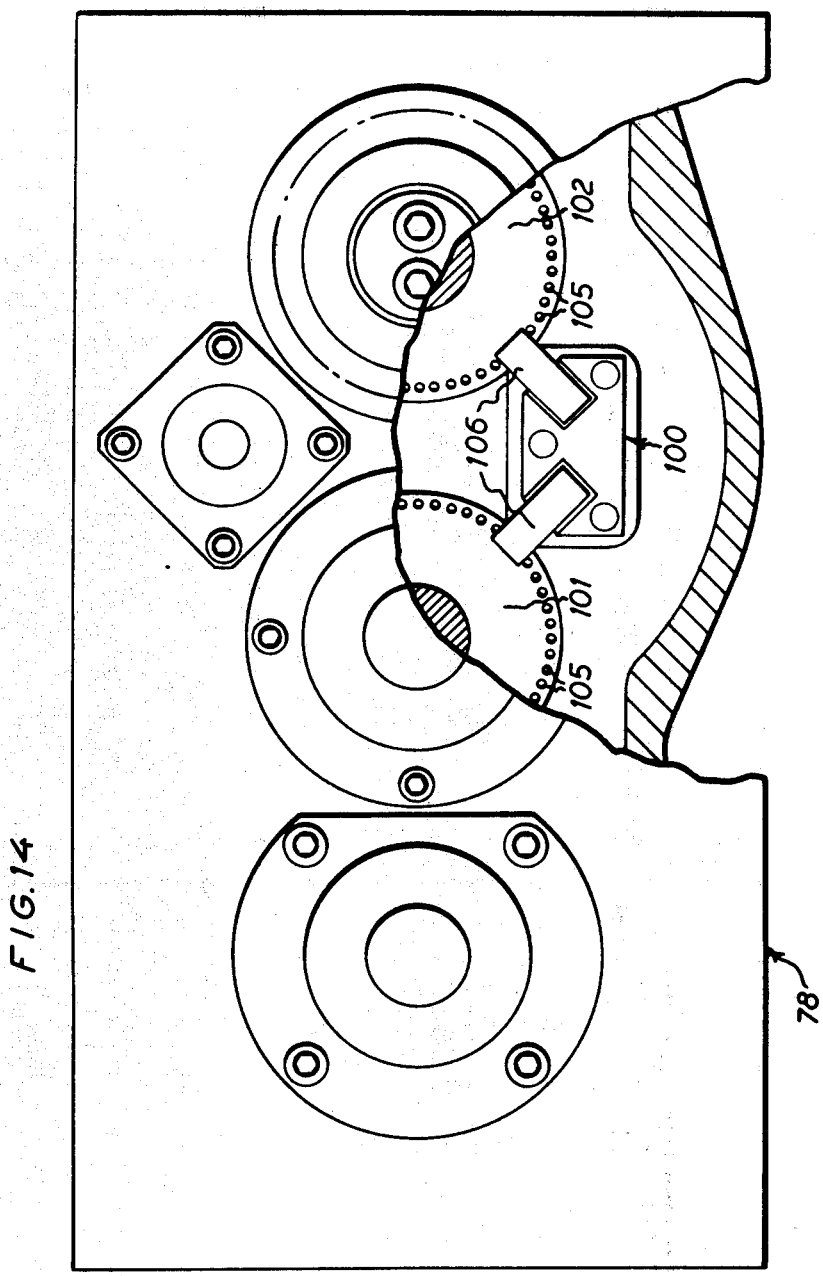

FIGS. 4A and 4B together show a front view of the machine;

FIG. 5 shows a side elevation of the machine;

FIG. 6 shows a side elevation of a tool unit;

FIG. 7 shows a tool saddle with a spindle unit partly in axial section;

FIG. 8 shows a cross-section taken on line VIII—VIII in FIG. 7, the spindle unit having been removed;

FIG. 9 is a side elevation of the spindle unit in FIGS. 6 and 7, partly in axial section;

FIG. 10 partly in side elevation and partly in vertical section shows the top cutter cylinder and its associated holdingdown press;

FIG. 11 shows a horizontal section of the top cutter cylinder and its associated holding-down press taken on line XI—XI in FIG. 10;

FIG. 12 is a view, on a larger scale, of the feed mechanism in FIG. 1;

FIG. 13 is a side elevation of the discharge table in FIG. 4A and shows the table partly in section;

FIG. 14 is a broken plan view of the distributor gearing in FIG. 6.

As illustrated in FIG. 1 the sound attenuating housing which is built around the planing machine according to the invention (diagrammatically shown in FIG. 2) is substantially of parallel-epipedical shape and is carried by a box-frame construction 1 (see FIG. 3) of sound attenuating design. The housing comprises readily detachable walls and roof of sound insulating design, which are mounted on a bottom frame 2 of the box-frame construction 1. The wall at the front of the housing is largely formed by two doors 3a, 3b and otherwise consists of detachable panels 3c–3h which facilitate access to such inner machine parts as cannot directly be reached via the doors 3a, 3b. At the rear side the housing may also have doors facilitating the access thereto. The upper portions of the housing which are designated 4a and 4b are in the form of cable reels. Of the panels 3c–3h illustrated, panel 3c is a blind panel and behind it there is the requisite space for supplementary equipment, if any. Panels 3d, 3e give access to certain machine elements, panels 3f, 3g give access to numerical control units, and panel 3h gives access to electrical components, int.al. a main switch. Panels 3f–3h may be the front walls of detachable cabinets for the respective equipment. The tools (cutter cylinders) and the work process can be supervised through a window 5 in the door 3a having double glass-panes. The supply of work pieces takes place through a feed opening 6a in one end wall 7a of the machine housing and the discharge of the planed work pieces takes place through a similar opening 6b (see FIG. 2) in the opposite end wall 7b of the machine housing. Of said frame 2 and stiffening beams, the box-frame construction and a top roof beam 8 only are shown in FIGS. 1 and 2, but the structure preferably also comprises an upper frame and vertical columns.

Figure 2:
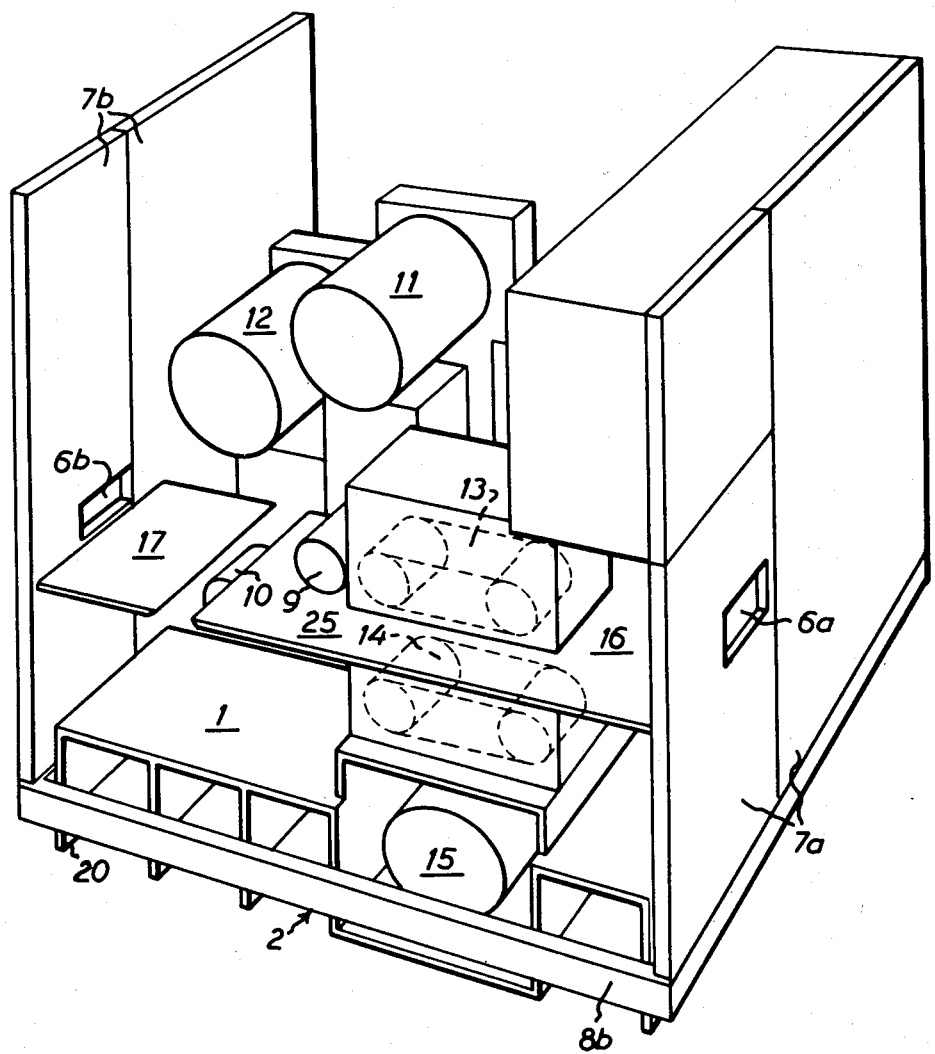
FIG. 2 is a diagrammatic perspective view of the planing machine and its frame after partial dismounting of walls and cabinets forming the housing.

FIG. 2 diagrammatically shows a top cutter cylinder 9 and a bottom cutter cylinder 10 with pertaining electrical drive motors 11 and 12, respectively, an upper and a lower feed mechanism 13 and 14 with a common drive motor 15, a feed table 16 and a discharge table 17 with fixed and adjustable guide bars (not shown in FIG. 2).

The box-frame construction 1 (see FIG. 3) is a welded unit with several parallel boxes or compartments which are dimensioned according to a module system with respect to width, height and length. The drive motor 15 of the feed mechanism is placed in the largest compartment.

In the upper panels 3d–3h in FIG. 1 simple symbols indicate a number of instruments and push buttons for the control of the machine.

It will appear from the foregoing that the entire machine is enclosed in a compact housing which is specifically designed for shielding of the machine proper and for facilitating access to the vital parts of the machine. The only openings in the housing that are open during operation are the feed and discharge openings 6a, 6b. A vacuum can be maintained in the whole of the housing for dust exhaustion by means of a fan (not shown) which via chip hoods in the housing concentrates the suction to the area of the cutter cylinders.

It should also be mentioned that the box-frame construction 1 is carried on the base by means of foot rests 20 between which the forks of lift trucks can be inserted for fork lift truck transport of the entire machine including the housing.

FIGS. 4A, 4B and 5 show the construction of the machine more in detail.

Work pieces 21 are fed through the inlet 6a of the housing to the feed table 16 between a pair of guide bars, one of which 22 is adjustable while the other guide bar 23 constitutes a stationary abutment. On the table 16 the work pieces are fed between the upper and lower feed mechanisms 13, 14 each of which includes an endless feed belt 13a and 14a, respectively. From the feed mechanisms the work pieces 21 arrive at a top cutter cylinder table 25 (see FIG. 4A) where they are treated by the upper cutter cylinder 9, and are moved beneath a so-called hold-down device 26 on the discharge table 17 between a pair of laterally adjustable guide bars 27 to be treated by means of the bottom cutter cylinder 10 and then discharged from the table 17 through the outlet 6b. The discharge table 17 is vertically adjustable by means of a mechanism 28.

The feed belts 13a, 14a each consist of parallel chains which carry a bed of parallel transverse rods 29 and run on sprocket wheels, such as sprocket wheel 30. A sprocket wheel for each belt is driven by the motor 15 via a transmission (see FIG. 12) consisting of a toothed-wheel gearing 30a, an intermediate shaft 31 driven by said gearing and driving, via a gearing 30b, a second intermediate shaft 32, a gearing 30c and a drive shaft 33, on one hand, the lower belt 14a and, on the other hand, a gearing 30d which in turn via a shaft 34 drives a gearing 30e which finally drives the upper belt 13a via a shaft 35. The shafts 32 and 34 form universal joints about which the gearings 30b, 30c and 30d, 30e, respectively, can pivot in relation to each other, without any change of driving engagement, to facilitate vertical adjustment of the feed belts 13a, 14a. The lower belt 14a can be vertically adjusted beforehand, while the vertical adjustment of the upper belt 13a can be carried out at any time in response to the thickness of the work pieces.

The upper feed belt 13a is carried by a spring suspension in the form of four coil springs 36 (two springs are shown in FIG. 4B) in a housing 37. The spring load is adjustable by means of a clamping screw arrangement 38 and can be read on a spring pressure graduation 39.

The housing 37 with the upper feed belt 13a is vertically adjustable by means of four columns 40 each of which extends through a supporting tube 41 and has a threaded lower end portion screwed into the threaded hub of a sprocket wheel 42 which is mounted for rotation and axially fixed in a bearing housing 43. The sprocket wheel 43 can be driven by a motor 44 via a gearing 45, a sprocket wheel 46 driven by said gearing, and a chain 47. The idler sprocket wheels of the feed belts 13a, 14a, such as the sprocket wheel 30a, are adjustable longitudinally of the machine by means of a suitable setting device, such as screw means 48 (see FIG. 4B), to permit stretching of the belts 13a, 14a and to facilitate exchange thereof.

It will be realized from the foregoing that the five gearings 30a–30e (of which only the outer protective housings are shown in FIGS. 4B and 12) permit vertical adjustment of the feed mechanisms 13, 14, and that the adjusting means 40–47 permit vertical adjustment of the upper feed mechanism 13 to cause the upper feed belt 13a to engage the work piece 21 under a force of engagement dependent upon the adjustable spring load 36. At accidental thickness variations of the work piece 21 the spring load 36 permits the belt 13a to move upwardly and downwardly, the transmission 30a–30e continuing, in spite of said upward and downward movements, to drive the two belts at unaltered speed. Such an unaltered operation is also possible at vertical adjustment of the upper feed mechanism 13 with the aid of the means 40–47. Height setting alterations via the means 40–47 can be realized with the aid of some of the setting means illustrated in FIG. 1 and the speed of the drive motor 15 of the feed mechanism can also be altered. The drive motor 15 as well as the other motors in the planing machine according to the invention preferably is an electric motor. After the door 3b in FIG. 1 has been opened, the guide bar 22 and the locking means 22' therefor are accessible for adjustment. If desired, the adjusting means for the guide bar 22 may be supplemented with a suitable servomotor arrangement which can be controlled with the aid of some of the adjustment handwheels on the control panels in FIG. 1. The screw arrangement 38 for adjusting the spring load 36 is also easily accessible through the door 3b to allow actuation by means of a handwheel or possibly a tool, and at the same time the spring load graduation 39 can be read.

From the feed mechanism 13, 14 the work piece arrives at the top cutter cylinder 9 by means of which the work piece is planed on the upper side. In conjunction with the top cutter cylinder 9 the machine is equipped with a press 50 for holding down the work piece against the top cutter cylinder table 25 in the area where the work piece passes beneath the top cutter cylinder. The press 50 is more fully described in a subsequent paragraph with reference to FIGS. 10 and 11.

The top cutter cylinder 9 constitutes an independent tool unit of the same design as the bottom cutter cylinder 10 at which the work piece arrives from the top cutter cylinder for planing of the underside of the work piece. This tool unit which is shown in FIGS. 6–9 comprises in addition to the planing tool itself a spindle with associated bearing means and all requisite means for the vertical and lateral adjustment and operation of the spindle. Said spindle with its bearing means constitutes a unit 51 which can be removed from the machine by a simple motion and then transferred to the grinding chamber for adjustment, grinding and honing, whereupon it can be reinserted in the machine, quite as simply, in a condition entirely ready for use.

Said unit 51 which will hereinafter be termed "spindle unit", is shown in detail in FIG. 9.

As shown in FIG. 9, the spindle unit 51 comprises a spindle 55 which has its opposite ends mounted by means of ball bearings 56 at the end portions of a sleeve-shaped bearing housing 57. The front end of the spindle is in the form of a cone 58 on which the cutting tool (not shown) can be mounted. The rear end of the spindle is in the form of a coupling member 59 to be connected with a corresponding coupling member driven by the drive motor 11 in FIG. 6 (or 11 or 12 in FIG. 4A). Conventional means for lubrication of the mounting points of the spindle in the encapsulated bearing housing 57 are provided and illustrated in FIG. 9; however, they are not described in detail.

The spindle bearing housing 57 is mounted in a tube 61 in a tool saddle (see FIGS. 7 and 8) which is generally designated 79 and constitutes a bearing housing consisting of a foot portion 62 with a substantially semi-cylindrical base member, and an upper portion 63 connected to the foot portion 62 by means of a number of bolts 64. For centering of the housing comprising the portions 62 and 63 the tube 61 is adjustably mounted between two diametrically positioned longitudinal guide bars 65 which are inserted in parallel grooves in the inner sides of the portions 62 and 63 and rest on planar surfaces on the outer side of the tube 61. The clearance between the tube 61 and the guide bars 65 is adjustable with the aid of a number of axially spaced setting means, such as set screws 66 with nuts. One or more such set screws can extend into a bore in the respective guide bar 65, as shown at 66a, for axial fixation of the guide bars, while the other set screws can abut the outer sides of the guide bars with their planar ends. The lower guide bar 65 may be fixed by pins 67 (see FIG. 8) instead of set screws 66 of the type utilized for the upper guide bar. Keys 68 (shown in FIG. 8 but not in FIG. 7) can be arranged between the guide bars and the tube 61 to prevent rotation of the tube at the axial adjustment thereof.

Said tube 61 forms a holder in which the spindle unit 51 can be inserted as a cartridge in a cartridge chamber and in which the spindle unit can be locked in a simple manner. As is described more in detail in the following, said tube 61 also forms a slide member for the axial adjustment of the spindle with the tool.

After being inserted in the tube 61, the spindle unit 51 can be locked thereto by suitable radial and axial fastening means which permit a rapid fixation and release of the spindle unit 51. A suitable device for this purpose comprises for example a clamp 70 for axial locking of a flange 71 of the bearing housing 57 to the tube 61, and a bolt 72 screwed into said tube for fixation of the spindle unit 51 by coaction with an abutment of the flange 71.

As already mentioned, the tube 61 forms a transverse slide member movable along the guide bars 65 for axial adjustment of the spindle unit 51 relative to the table 25 or 17 on which the work pieces are advanced. To this end, the tool unit is equipped with a device for lateral adjustment. Said device includes a motor 75 the output shaft of which is connected via a coupling 76 to the input shaft of a mitre gear 77 which is provided for the operation of a distributor gearing 78 between the side walls of the tool saddle 79. The shape of said saddle will appear from FIG. 8. Part of said saddles is formed by the wall portion 62. The motor 75 drives a bevel gear 80 of the distributor gearing 78, said bevel gear 80 meshing with a bevel gear 81 which by means of a threaded hub is carried by and engages with a threaded rear end portion 61' of the tube/transverse slide member 61. The gear 81 is mounted for rotation in and axially fixed by means of an outer race 82 which is connected to the tool saddle 79 by means of bolts 83. The gear 91 thus constitutes an axially fixed rotary nut for reciprocating the slide member 61. For axial fixation of the slide member 61 in the adjusted position use is made of a spring-loaded clamping device 84 comprising a clamp 85 which through a recess in the cover 63 of the bearing housing extends into engagement with the upper guide bar 65, and a coil spring 86 interposed between the clamp arms 87. By the traction of the spring 86 the clamp 85 is urged against the guide bar 65 and normally holds the slide member 61 locked in the axial position adjusted. However, the force exerted by the spring can be cancelled by means of an electromagnet 88 (see also FIG. 4A) which is adapted, when energized, to abolish the locking effect of the spring by moving the arms 87 apart to thereby release the slide member 61 for operation by the motor 75. As will appear from the following, use is made of a similar release means 84 also for a device for vertical adjustment of the tool unit.

For vertical adjustment of the tool unit in FIG. 7 the tool saddle 79 is supported vertically adjustably in a framelike holder 90 (see FIGS. 5 and 6) which is connected to the box-frame construction 1 by means of bolts 91. The holder 90 has vertical guide surfaces 92 which are grasped by two pairs of vertical guide bars 93 secured to the saddle 79 near the ends thereof. The device 84 for locking the tool saddle 79 in the adjusted position is shown beneath the two cutter cylinders 11 and 12 in FIG. 4A and is indicated in FIG. 7. The device corresponds to the described clamping device for locking the slide member 65 in that said device includes a coil spring 86 and a release magnet 88. The spring is adapted via levers 95 to clamp a bar 93 (of restricted mobility towards and away from the saddle 79) to the frame 90 for locking the saddle 79. Said levers 95 can be moved apart by means of the magnet for unloading the spring and releasing the tool saddle for vertical adjustment thereof.

The vertical adjustment of the tool saddle is also realized by means of the motor 75 via the coupling 76, the miter gear 77 and the distributor gearing 78, which by means of a magnet clutch (not shown) controllable from the operating panel of the machine is adjustable for release of the gear 80 and actuation of a vertical screw 96 which engages in a nut 97 fixed in the machine frame. After release said tool saddle 79 can be vertically adjusted by rotation of the screw 96.

The construction described above of the spindle unit and the mounting thereof in the tool saddle 79 has for its object, as has already been mentioned, to permit exchange of spindle units in the machine and/or withdrawal of the spindle units for grinding and adjustment in the grinding room, which makes certain steps unnecessary, particularly an adjustment of said units in the machine. To this end, use is made, in the grinding chamber, of a model of the distributor gearing 78 which serves to adjust the tool vertically and transversely and which will be described hereinbelow with reference to FIGS. 7 and 14. For zeroising the tool in the machine after it has been adjusted in the grinding room, that is to say, for setting the tool with regard to the adjustment thereof, the distributor gearing which is in the form of a readily detachable unit, incorporates an indexing device 100 which for reading of the angular position and the number of setting revolutions of the screw 96 and the gear 80 (and, consequently, the vertical and lateral position of the tool unit) includes two indexing discs 101, 102 each carried by a means 103 for operating the screw 96 and the gear 81, respectively. Said discs 101, 102 are formed around their periphery with a number of reading holes 105 for cooperation with reading forks 106 which transmit light through the holes and receive the light in photocell means, delivering counting pulses to a counter in the electronic cabinet of the machine. Reference positions for the tool are read in the grinding room. These reference positions are fed into the counter, whereupon the tool is inserted into the machine in an O-position. From this O-position the pulses are counted in vertical and horizontal sense to the position the tool shall have when working. The pulses are sent electrically to the electronic cabinet of the machine, where the counter receives the pulses and automatically stops the servomotor, locking the tool by deenergization of the electromagnets 88 when the tool unit has reached the correct height and lateral positions.

It is shown in FIG. 6 how the motor 11 with associated gear box 110 is detachably mounted on the tool saddle 79 by means of bolts in holes 111 (see FIG. 7). The output shaft of the gear box is coaxial with the longitudinal axis of the spindle (indicated by means of a line 112) and is connected with the spindle by means of a coupling member (not shown) which conforms to the coupling member 59 of the spindle (see FIG. 9). The coupling between the gear box 110 and the spindle 55 is enclosed in a dust and oil tight bellows 113. Moreover, FIGS. 6 and 7 show how the servomotor 75 for height and lateral adjustment of the cutter cylinder is carried by a bracket 114 detachably mounted on the tool saddle 79. The mounting of the two tool units (top and bottom cutter cylinders) is also apparent from FIG. 5 where use is made of reference numerals 75 and 82 and the suffixes $a$ and $b$, the suffix $a$ relating to the top cutter cylinder and the suffix $b$ to the bottom cutter cylinder.

It will be realized from the foregoing that the spindle unit 51 is easily withdrawn and replaced in an exactly defined position and that the entire tool saddle 79 with the tool and the drive motor 11 (12) as well as the servomotor 75 is easily handled and mounted as a unit, or can be divided into ever smaller components, such as motors, gear boxes, tool saddle 79, spindle unit 51 etc. individually or several components in combination. These possiblities highly facilitate the maintenance of the machine.

The work piece hold-down means or press 50 briefly mentioned in the foregoing, which is shown in FIG. 4A and more in detail in FIGS. 10 and 11 incorporates a frame 120 which consists of a pair of vertical bars 121 and a frame member 122 carried above the table 25 having a spring plate 123 obliquely inclined in the direction of advance of the work piece on the table 25, and a lower transverse shaft 124 which is pivotally mounted in the frame bars 121. On a transverse beam 125 above the shaft 124 the frame 120 carries a transverse spring support plate 126 on which rests the lower end of a strong coil spring 127. The spring 127 is passed onto a rod 128 which carries a spring support plate 129 at its upper end. The rod 128 extends with its lower end portion movably through the lower spring support plate 126 and through the middle portion of a shaft 130 to the underside of which the rod 128 is fixed by means of a nut 131 screwed on the rod 128 into engagement with the shaft 130. At opposite end portions the shaft 130 is mounted in adjoining end portions of two parallel link arms 132 which have their opposite end portions rigidly connected to a shaft 133. The shaft 133 in turn is mounted in two parallel link arms 134 which extend obliquely downward and are connected to the lower pivot axis 124 of the frame 120, and in the vertical elements 136 of a vertical frame 135 which is pivotally connected to the frame 120 and is movably guided by means of sliding blocks 137 at their upper and lower ends on a pair of vertical guide rods 138 which are screwed with their lower ends into the box-frame construction 1. The frame members 136 are connected at their upper ends to a shaft 139 which carries two link arms 140 rotatably mounted thereon and connected to a shaft 141 rotatably mounted in the frame 120 of the hold-down means or press 50.

By the action of a work piece which is moved on the table 25 to the left as viewed in FIG. 10, the frame 120 can be raised against spring action to allow the work piece to advance and at the same time press the work piece against the table 25. To permit vertical adjustment of the frame 120 in response to the thickness of the work piece said frame is vertically movable upward by means of a motor 142 and a miter gear 143 which is combined with a screw and nut mechanism. The motor drives the miter gear 143 via a reduction gearing 144, and the miter gear includes a bevel gear 145 the hub of which is threaded and accomodates a screw 146 which is non-rotatably fixed in a block 147 in which the shaft 133 is mounted and which in the FIG. 10 position of the frame 120 bears with its upper end against the spring support plate 126 which carries a limit switch 148.

The frame 120 at the adjustment thereof is pulled downward by means of the screw 146 connected to the shaft 133 so that the hold-down plate 123 is pressed against the work piece. When the frame 120 is pulled a further distance downward this takes place against the action of the spring, and as the spring support plate 126 and the block 147 are then separated from each other, the limit switch 148 is released and cuts out the motor 142, whereupon the work piece is pressed against the table 25 by the spring force.

The tension of the spring can be regulated by means of a spring tensioning mechanism cooperating with the shaft 133. Said spring tensioning mechanism is generally designated 150 in FIG. 11 and consists of a screw 151 which is rotatably but axially non-displaceably mounted in bearings in a holder 152 and engages a nut 153 which in turn is non-rotatably, but axially moveably carried by means of a swing arm 154 which is mounted on a rod 155 attached to the box-frame construction 1. The arm 154 is connected to another arm 156 with which it forms a bell crank lever. The arm 156 acts by the intermediary of an actuating member 157 upon an idler roller 158 on a shaft which is mounted in a crank arm or eccentric 160 on the shaft 133 (FIG. 10.

As will be clearly understood from the aforesaid the spring 127 tends to hold the idler roll 158 in contact with the actuating member 157. That is clear from the fact that by acting on the spring support plate 126 the spring 127 tends to move the shaft 130 in FIG. 10 and thereby to move the right end of the link 132 downwardly. The link 132 is rigidly connected to the shaft 133 which in its turn is connected to one end portion of the crank arm 160 and thus the link 132 tends to rotate the crank arm 160 in a clockwise direction. The other end portion of the crank arm 160 which supports the idler roll 158 via a shaft will therefore, by the action of the spring 127, keep the idler roll 158 in contact with the actuating member 157. By rotating the screw 151 for rotating the bell crank lever 154, 156 in counter-clockwise direction the actuating member 157 and the idler roll 158 will be moved to the left in FIG. 11, which will be accompanied by a swinging movement of the arm 160 against the action of the spring 127. By rotating the screw 151 in the opposite direction the member 157 of course will be moved to the right. In this way the tension of the spring 127 may be increased or decreased.

The screw 151 is operable by means of a crank (not shown in FIG. 11) inside the door 3b of the machine housing (FIG. 1), but use can of course also be made of a servomotor for adjustment of the spring tension.

The wood hold-down device 26 shown in FIG. 4A is carried on the frame by means of a holder 170 and is laterally adjustable along a guide 171 having a groove in which engages a screw 172 which is movable along the groove and arrestable by means of a wing nut 173.

The discharge table 17 (see FIGS. 4A and 13) is vertically adjustable by being moved along a guide track 175 on a frame 176, said guide track being inclined relative to the longitudinal direction of the machine. The frame 176 is connected to the boxframe construction 1. The inclined guide track 175 lies in a plane tangent to the upper side of the bottom cutter cylinder 10 (see FIG. 4A). Vertical adjustment of the table 17 by moving it along the inclined guide track is effected by means of a handwheel 178 associated with a screw mechanism 28 and accessible through the left door 3a in FIG. 1.

It will be apparent from the foregoing that all components of the machine according to the invention are designed to facilitate mounting and dismounting of all vital parts either as large units or as subunits, according to need and circumstances. A further characteristic property of the machine according to the invention is that all or at least the most important machine elements can be adjusted and regulated from the outer side (front) of the machine housing by control means for electric motors or by mechanical operating means, or are readily accessible through a door. In spite of its easy accessiblity and dismountability the machine is of very compact design. The various units of the machine can without difficulty be supplemented with other units of the same design on a box-frame construction 1 which includes a greater number of module units than dies the boxframe construction illustrated. If a machine according to the invention should be equipped also with a pair of lateral cutter cylinders, these may be constructed in substantially the same way as the tool units described, which comprise the top cutter cylinder 9 and the bottom cutter cylinder 10, respectively, and can be mounted ahead of, between, or after the top and bottom cutter cylinders. For an enlargement of the machine the feed mechanism 13, 14 need not be supplemented, but it may of course be necessary to enlarge or modify the tables illustrated. A planing machine according to the invention which is equipped with lateral cutter cylinders differs from the machine described and illustrated only by the new units it comprises and by its slightly larger length.

As mentioned by way of introduction, the machine housing is of a sound attenuating and dust-shielding design. The walls may be of shell construction with sound-insulating intermediate layers of glass fibres or mineral fibres. By its compartmented design the box-frame construction also contributes to noise damping. The dust-shielding properties of the housing naturally depend in part on the fact that the housing relatively tightly surrounds the machine and thereby prevents escape of dust, but in addition the housing in its entirety constitutes a single large dust hood from which dust is discharged by the chip evacuation realized by chip evacuation hoods 200 with dampers 201 and outlet passages 202 which have their inlets mounted in the vicinity of the cutter cylinders (see FIG. 4A) for direct collection of chip from them. The suction from the dust evacuation hoods 200 will however be effective in the entire housing and thus keeps both the machine itself and the environment clean from dust.

It will be realized from the foregoing description that the planing machine according to the invention is of a compact design encapsulated in a sound attenuating and dust shielding housing and is equipped with tool units which are interchangeable and are readily withdrawable and insertable again in the machine, said units including spindle units 51 which by reason of the special ease of mounting them in and withdrawing them from a slide member 61 associated with the respective tool unit, can be compared to "tool cartridges", the slide member housing 61 constituting "cartridge chambers" for said tool cartridges. The advantages gained by the unique construction of the tool units and the spindle units is supplemented by exact adjustability with the use of small distributor gearings designed as units and driven by small servomotors and adapted to cooperate with the numerical control systems of the machine for tool adjustment according to reference values obtained from the grinding chamber and operation of the machine according to supplied working programs.

What I claim and desire to secure by Letters Patent is:

1. A wood working machine, particularly planing machine, including a frame and a plurality of machine components carried by the frame and assembled into a number of independent units, said machine comprising at least one working section including a motor-driven spindle for supporting a rotary wood working tool at a working position, a motor-driven feed mechanism for feeding work pieces through the machine, and adjustable guide means for guiding work pieces to and away from said working position and for keeping them engaged with a base during working, said components and said units assembled therefrom being removably mounted in a compact array, said wood working section comprising at least one independent detachable tool support unit composed of first and second subunits which are detachable from one another, wherein said first subunit is a spindle unit comprising a cylindrical spindle bearing housing and a spindle mounted in bearings in said housing, while said second subunit for axial adjustment of the spindle and consequently for setting of the tool along a first axis in relation to a movement of the work piece determined by said feed and guide mechanisms includes a support, a slide member guiding means and a first hollow slide member mounted in said guiding means and having a cylindrical chamber for receiving the spindle unit, said spindle unit being slidably insertable in and withdrawable from said chamber and being axially and radially lockable in a reference position in said chamber by releasable locking means, said spindle unit forming said first subunit being axially movable and adjustable in said second subunit for permitting setting said tool along a first axis and said second subunit being arranged to be movably supported as a second slide member on a support connected to the frame to permit adjustment of the tool along a second axis at right angles to said first axis.

2. A machine as claimed in claim 1, wherein said spindle of said spindle unit comprises at its rear end a coupling member, and said tool support unit comprising a drive motor including transmission and a shaft driven by said transmission and having a coupling member for releasably connecting it to said coupling member of said spindle.

3. A machine as claimed in claim 2, wherein said first slide member in the chamber of which the spindle unit is received, is in the form of a hollow open-ended cylindrical member having such an inner diameter as to permit insertion of the cylindrical spindle unit through one end thereof, the open rear end of said open-ended cylindrical member being dimensioned to receive said coupling member of said transmission in coupling engagement with said coupling member of said spindle.

4. A machine as claimed in claim 1, wherein said second subunit constitutes a second slide member which forms a holder for the first slide member, said holder comprising a housing for receiving and enclosing an intermediate portion of said first slide member, and adjustable, longitudinally extending guides between and in contact with the inner side of said housing and said first slide member for radially centering of said first slide member in adjusted position along said first axis.

5. A machine as claimed in claim 4, wherein said housing is open at both ends to permit unimpeded movement therein of the first slide member with the spindle unit placed therein.

6. A machine as claimed in claim 4, wherein the first slide member has a cylindrical threaded outer peripheral portion which forms a screw and said tool support unit comprises a gear wheel having a threaded part which forms a nut engaging said screw, said gear wheel being axially fixed but rotatably mounted relative to said holder, said tool support unit also comprising a servomotor and a gearing by means of which said gear wheel with said nut is rotatable for adjustment of the slide member via said screw.

7. A machine as claimed in claim 6, wherein said gearing and said servomotor are detachably connected to and carried by said second slide member which serves as a holder for said first slide member.

8. A machine as claimed in claim 4, wherein said second subunit for locking the first slide member in the adjusted position relative to said slide member guide and for locking said second subunit-slide member in adjusted position relative to said frame has two substantially identical locking devices each of which comprises a spring-loaded locking means for respectively locking the first slide member relative to said second subunit-slide member and for locking the said second subunit-slide member to said holder, and an electromagnet for releasing the first slide member and said second subunit-slide member, respectively, against the action of the spring load of said locking means.

9. A machine as claimed in claim 6, wherein said second subunit has an axially fixed, rotatably mounted screw which is adapted to be driven by said servomotor via said gearing and for engagement with a threaded part fixed relative to the frame.

10. A machine as claimed in claim 9, wherein said gearing includes a distributor gearing carried by said second subunit-slide member and having an electrically actuable switching device for switching the distributor gearing for optional operation of said screw and thereby said gear wheel.

11. A machine as claimed in claim 10, and comprising an electronic control system including an electronic pulse counter, wherein said distributor gearing is equipped with an indexing device including two indexing discs one of which is connected to rotate together with said nut-gear wheel while the other disc is connected to rotate with said screw, and a reading device adapted, upon rotation of each indexing disc, to read the angular position and number of revolutions of the indexing disc by counting the number of indexes on the disc moving past said reading device and to send corresponding electrical pulses to said electronic counter in said electronic control system associated with the machine.

12. A machine as claimed in claim 1, wherein the distributor gearing with its indexing and reading devices is constructed as a copy or model of a distributor gearing in a tool grinding station to permit adjustment of the tool in dependency on reference positions obtained in the grinding station.

13. A machine as claimed in claim 1, including at least one further tool support unit identical to said tool support unit, said tool units as well as its subunits being interchangeable.

14. A machine as claimed in claim 13, wherein said at least two identical tool support units are equipped with tools in the form of cutters one of which is mounted as a top cutter and the other as a bottom cutter in close conjunction with each other for planing the work piece at the top and the underside, wherein said feed mechanism includes an upper guide plate and a work piece hold-down device, said feed mechanism being arranged in close proximity to the work piece hold-down device which in turn is arranged in direct conjunction with the top cutter for holding down the work piece against said guide plate, and a vertically adjustable guide arranged in direct conjunction with the discharge side of the top cutter over the path of motion of the work piece, said vertically adjustable guide being arranged to engage the planed upper side of the work piece, and, in direct conjunction with the discharge side of the bottom cutter, a vertically adjustable table which for vertical adjustment is movable along an inclined track forming a tangent to the upper side of the bottom cutter, and said first slide member is a transverse slide member for the respective cutter, while said second slide member is a vertically movable slide member.

15. A machine as claimed in claim 14, wherein the work piece hold-down device includes a spring and a frame vertically movable against the action of said spring and carrying a work piece hold-down means, and a motor-driven height adjusting device by means of which the work piece hold-down means on the frame is adjustable into engagement with the work-piece and can be pulled downward some distance against the action of the spring load to be kept in engagement with the workpiece by the force of the spring.

16. A machine as claimed in claim 15, wherein the work piece hold-down device comprises a screw mechanism for adjusting the bias of the spring 17. A machine as claimed in claim 1, in which the feed mechanism includes two endless, driven feed beds situated respectively below and above the path of motion of the work piece, wherein the upper feed bed is carried by a vertically adjustable supporting device which is yieldingly and adjustably spring-loaded in a downward direction toward the path of motion of the work piece, and a common drive means for said feed beds, said drive means comprising a transmission having a universal joint to permit unaltered operation of the upper feed bed independently of the height position to which it has been adjusted.

18. A machine as claimed in claim 17, wherein said feed beds each comprise a frame means including supporting rods for supporting said upper feed bed, said rods having threaded lower end portions, wherein nuts are rotatably mounted on said threaded end portions of the rods and are axially fixed relative to the frame and wherein a drive means comprising a motor and a transmission is connected to said nuts for raising and lowering said upper bed by rotating said nuts.

19. A wood working machine, particularly planing machine, including a frame and a plurality of machine components carried by the frame and assembled into a number of independent units, said machine comprising at least one working section including a motor-driven spindle for supporting a rotary wood working tool at a working position, a motor-driven feed mechanism for feeding work pieces through the machine, and adjustable guide means for guiding work pieces to and away from said working position and for keeping them engaged with a base during working, said components and said units assembled therefrom being removably mounted in a compact array, wherein at least one main portion of said frame has a box-like, sound attenuating construction including a plurality of parallel, open-ended cells which form an integral piece.

20. A machine as claimed in claim 19, wherein the bottom frame is part of a framework which together with dust protective and sound attenuating walls forms a housing enclosing all of said machine components on all sides and comprising cabinets housing electrical equipment for controlling and driving all the necessary motors and other electrically driven components, said cabinets being provided with control means and instruments readily accessible from one side of the housing.

21. A machine as claimed in claim 20, wherein the only openings of the housing that are open during operation is an inlet and an outlet for work pieces.

* * * * *